Patented Mar. 6, 1923.

1,447,892

UNITED STATES PATENT OFFICE.

RICHARD RODRIAN, OF NEW YORK, N. Y., ASSIGNOR TO RODRIAN ELECTRO-METALLURGICAL CO., INCORPORATED, OF NEW YORK, N. Y., A CORPORATION OF DELAWARE.

SMELTING AND ELECTROLYTIC PROCESS.

No Drawing.   Application filed March 30, 1921.   Serial No. 457,037.

*To all whom it may concern:*

Be it known that I, RICHARD RODRIAN, a citizen of Germany, and resident of the borough of Manhattan, city, county, and State of New York, have invented certain new and useful Improvements in Smelting and Electrolytic Processes, of which the following is a specification.

The object of the present invention is to obtain metals or alloys from ores and other minerals, slag, scrap or other materials containing such metals, and also to make alloys of any composition. The improved process also enables me to convert metal oxids into lower oxids or into metals and metal sulfids as well as metal salts into metals.

In carrying out my invention, the ores or other minerals, slag, scrap, metal oxids, metal sulfids or metal salts, in a finely powdered condition are caused to react with a molten mass of salts containing nitrogen, for instance sodium nitrate or potassium nitrate, or a mixture of both, etc. The nitrogen salts may be melted first, and the metal-bearing material then added to the melt, or all the ingredients may be mixed or put together before melting. When metals of high melting point are to be extracted, I have found that this can be accomplished more readily by adding to the other ingredients, metals of relatively low melting point, such as tin, zinc, lead, quicksilver, etc., or the oxids, sulfids or salts of such metal of low melting point, such metal, oxid, sulfid or salt forming a flux, as it were.

When alloys are to be produced, the metals composing the alloy, or the oxids, sulfids or salts of such metals, are either added to the previously melted nitrogen salts, or all the ingredients are melted together.

The melting of the ingredients may be accomplished in any suitable manner, preferably in a crucible made of electrically-conductive material, such as iron or graphite, so as to make it easier to pass an electric current through the melt. The melting temperature may be produced, for instance, by externally heating the crucible in any well-known manner.

When the mass has become liquid, it is subjected to the electrolytic action of an electric current. When the crucible is made of electrically-conductive material, it will form the cathode, and the anode will preferably consist of a rod of carbon or graphite or of a metal having a high melting point. Instead of producing the melting temperature by external heating, I may rely on the internal heating action of the electric current to melt the nitrogen salts and the metals or metal-bearing substances.

Of course it is not necessary to employ the crucible as one of the electrodes, and if preferred, both electrodes may be rods or other bodies dipping into the molten mass.

The potential of the direct current employed may vary from 4 to 6 volts, and its amperage from 10 to 2000 depending on the character and amount of the substances to be treated.

Under the electrolytic action of the current, the metals contained in the melt are deposited in a metallic condition on the cathode. If there is only one metal in the melt (this is a rather exceptional case), that metal will be recovered alone. If the mass contains two or more metals, these will be deposited together, forming a mixture or alloy, which may be used as such if its composition renders it available for industrial or other purposes, or the metals contained in such mixture or alloy may be separated from each other by any well-known or approved treatment, such as treatment with acids, etc. Whether a mixture of metals or an alloy is obtained, depends on the proportions of the metals contained in the melt.

In certain cases, it is desirable to employ soda ash (sodium carbonate) or caustic alkali (soda) in conjunction with the nitrogen salt.

*Example.*

Fifty pounds of sodium nitrate and five pounds of soda ash are melted in an iron crucible, either by externally applied heat, or by an electric current, the heating being continued until the melt becomes quite liquid. Into this melt I then introduce twenty pounds of powdered metalliferous ores or other metalliferous materials, or the same amount of metal oxids, metal sulfids, or metal salts. After the heating has been continued for a further length of time which depends on the nature of the material under treatment, I add as a flux a readily fusible extractive metal, for instance five pounds of metallic lead. The negative pole of the source of electricity is connected with the crucible, so that the latter forms the cathode. The anode is formed by a carbon rod connected with the positive pole of said source and dipping into the incandescent molten mass. In the special case described as an example, a continuous current of about six volts and fifty amperes would be suitable. During the electrolytic action, the metals contained in the molten mass are deposited on the negative electrode, that is on the wall of the crucible, and are then taken up by the bath of molten lead contained in the lower part of the crucible.

When metal alloys are to be produced, the procedure is substantially the same as described above, but the metals employed must be present in the definite proportions required for obtaining the desired alloy.

Various modifications may be made without departing from the nature of my invention as set forth in the appended claims.

I claim:

1. The process which consists in melting a nitrate and a carbonate of the same alkali, introducing into the melt finely-divided material containing the metal or metals to be obtained, then adding metallic lead, and electrolyzing the molten mass.

2. The process which consists in causing finely-divided metal-bearing material to react with a molten mass of a nitrogenous alkali salt while passing an electric current therethrough.

3. The process which consists in causing finely-divided metal-bearing material to react with a molten mass of an alkali nitrate while passing an electric current therethrough.

4. The process which consists in causing finely-divided metal bearing material to react with a molten mass of a nitrogenous salt while passing an electric current therethrough.

5. The process which consists in causing finely-divided metal-bearing material to react with a molten mass of a nitrogenous salt in the presence of a metal-bearing flux while passing an electric current through such mass.

6. The process which consists in causing finely-divided metal-bearing material to react with a molten mass of a nitrogenous salt in the presence of a flux consisting of a metal of a relatively low melting point while passing an electric current through such mass.

7. The process which consists in melting and electrolyzing by the passage of an electric current, a mixture of finely-divided metal-bearing material with a nitrogenous salt.

8. The process which consists in causing finely-divided metal-bearing material to react with a molten mass containing a nitrogenous salt and a carbonate while passing an electric current through such mass.

9. The process which consists in causing finely-divided metal-bearing material to react with a molten mass containing the nitrate and the carbonate of the same element while passing an electric current through such mass.

10. The process which consists in causing finely-divided metal-bearing material to react with a molten mass containing the nitrate and the carbonate of an alkali metal while passing an electric current through such mass.

11. The process which consists in causing finely-divided metal-bearing material to react with a molten mass containing a nitrogenous salt and an alkali while passing electric current through such mass.

12. The process which consists in causing finely-divided metal-bearing material to react with a molten mass containing a nitrogenous salt and a caustic alkali while passing an electric current through such mass.

In testimony whereof I have signed this specification.

RICHARD RODRIAN.